March 14, 1950 B. E. PHELPS 2,500,294

DESCENDING COUNTER

Filed Aug. 13, 1947 4 Sheets-Sheet 1

INVENTOR
BYRON E. PHELPS
BY J J Robbins
ATTORNEY

March 14, 1950 B. E. PHELPS 2,500,294
DESCENDING COUNTER
Filed Aug. 13, 1947 4 Sheets-Sheet 2

INVENTOR
BYRON E. PHELPS
BY J J Rohlmes
ATTORNEY

INVENTOR
BYRON E. PHELPS
BY J J Robbins
ATTORNEY

INVENTOR
BYRON E. PHELPS
BY J. J. Robbins
ATTORNEY

Patented Mar. 14, 1950 2,500,294

UNITED STATES PATENT OFFICE 2,500,294

DESCENDING COUNTER

Byron E. Phelps, Wappinger Falls, N. Y., assignor to International Business Machines Corporation, New York, N. Y., a corporation of New York Application August 13, 1947, Serial No. 768,393

14 Claims. (Cl. 235—92)

This invention relates to electronic counters and its general object is to provide a direct subtraction electronic counter.

Prior art electronic counters are adding counters which may perform subtraction indirectly by addition of complements. Preliminary conversion of a subtrahend to its complement must be made and the number of places in the complement must be equal to the number of orders of the counter. Thus, to subtract 1 from a two-order counter, the complement 99 must be added to the counter. Entry of a value in an electronic counter is usually effected by application of a number of pulses equal to the value to be entered. So, to enter complement 99, ninety-nine consecutive pulses would have to be applied to the units order. If an accumulator type of counter, is used, each order has its own input circuit, but the problem of carry between orders is more complicated than for straight counters. In any event, to enter complement 99 into an electronic accumulator, at least nine pulses would have to be applied to each order.

In contradistinction, the present invention provides an electronic direct subtraction counter which subtracts a number directly and not by addition of its complement. Further, the invention provides an electronic direct subtraction counter which subtracts a value in response to application of a number of pulses equal to the value; e. g., it subtracts 1 in response to application of but a single entry pulse. The resulting gain in speed of subtractive calculation by such direct subtraction electronic counter over the speed of such calculation by an adding electronic counter is considerable and is highly important since the essential reason for employing electronic calculating devices is to effect calculations at high speed.

The invention is embodied in an electronic counter of the type having in each complete order a series of electronic stages to manifest all the digits of a chosen notation. Adding counters which subtract by addition of complements require as many complete orders as the number of places in the minuend. The present invention provides a direct subtraction electronic counter which requires in the higher order only as many stages as may manifest the highest digit in the largest minuend to be used. Thus, if such minuend is 39, the tens order may be incomplete since it needs only enough stages to manifest 3.

A feature of the invention is a carry circuit between orders of the electronic counter for effecting a subtractive carry of 1 to one order as a result of its lower order having stepped from the lowest to the highest digit manifestation; e. g. if the decimal notation is used, subtractive carry of 1 to a higher order will occur upon the lower order stepping from 0 to 9.

Another feature of the invention is a circuit operated under control of the orders of the electronic counters for signaling a zero remainder.

The invention further provides a direct subtraction electronic counter of the binary decimal type, the stages of a complete order relating to powers of 2 and being coupled in general binary fashion but supplemented by circuits for transposing operation from a binary basis to a decimal subtraction cycle basis. Thus, each complete order will have a descending value cycle of ten steps.

The invention also has for an object the provision of means to apply a number in binary term form directly to a binary decimal electronic counter or register.

More specifically, according to the invention, a number in binary term form is to be applied by individually operating the stages of each order in accordance with the binary terms in the number. Thereafter, stepping of the order is to be effected by applying entry pulses to an input of the order to cause interrelated operation of the stages.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a circuit view of an electronic trigger employed in the invention.

Fig. 1*a* is a block diagram of the trigger.

Fig. 2 is a sequence chart of the preferred embodiment.

Figs. 3*a* and 3*b* illustrate the circuit of the preferred embodiment.

Figure 1:
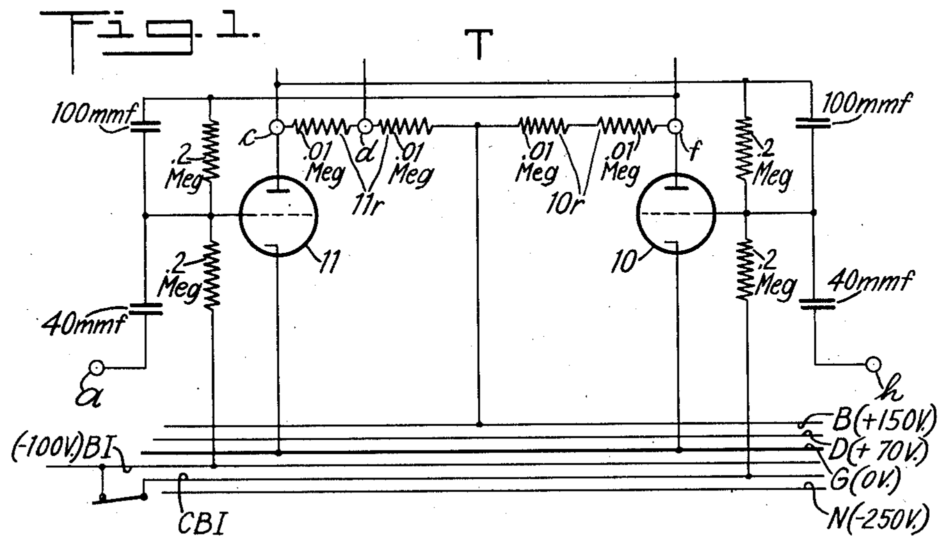
Figure 1A:
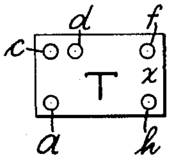

Voltage lines B, D, G, BI and N are supplied from a suitable source with voltages indicated in Fig. 1. Another voltage line CBI derives voltage from line BI while switch 15 remains closed. Typical constants are indicated in the circuit views but it is understood these may be widely varied without altering the substance of the invention. Resistance values are given in megohms and capacitance values in micromicrofarads. The triodes are halves of tubes of type 12SN7 and the pentodes are of type 6SK7. Fig. 1 shows the circuit of an electronic trigger of a type fully discussed in application Serial No. 569,992 of Palmer and Phelps, filed December 27, 1944. Briefly, this trigger includes two retroactively coupled tubes 10 and 11. The trigger has two relatively opposite stable states. In one state, here called the off state, tube 10 is conductive and its anode terminal f is at about 50 volts, while tube 11 is non-conductive and its anode terminal c at about 150 volts. In the opposite state, here called the on state, tube 10 is non-conductive and point f at about 150 volts while tube 11 is conductive and point c at about 50 volts. Upon reversal of the trigger from off to on state, there is a steep drop in potential or negative impulse of about —50 volts at midpoint d of the anode resistor 11r of tube 11. It is characteristic of this trigger that it is considerably more sensitive to applied negative impulses than to similarly applied positive impulses. In the present case, a negative impulse of about —50 v. applied to the trigger input terminal a or h or concurrently to both is more than sufficient to reverse the trigger but a similarly applied positive impulse of such amplitude is not effective to reverse the trigger. Reversal of the trigger also may be controlled by an auxiliary circuit operable to draw current through anode resistor 10r or 11r so as to depress the potential at the terminal c or f to about 50 volts. Thus, if such auxiliary circuit be connected to point c and operated, while the trigger is off, to draw current, then the circuit will cause the trigger to turn on but if at the same time another auxiliary circuit connected to point f is drawing current, then the latter circuit will lock the trigger in off state. When, as in Fig. 1. the grid of tube 11 is coupled to line BI and the grid of tube 10 to line CBI, the trigger may be reset to off state by opening the switch 15 to remove negative potential from line CBI. In consequence, negative bias is taken off the tube 10, causing the trigger to go off. When the grid of tube 11 is coupled to line CBI and the grid of tube 10 to line BI. the trigger is reset to on state upon opening switch 15.

In the circuit views (Figs. 3a, 3b and 4), letter x adjacent a tube denotes its stand-by conductive or on condition, letter x at the right side of the block diagram of a trigger denotes its stand-by off state, and letter x at the left side of the block diagram denotes stand-by on state. In the sequence charts (Figs. 2 and 5), on status of a tube or trigger is denoted by a heavy line and off state by absence of such line. Conditioning of a multi-grid tube by removing cut-off bias from one of its grids so that it may be subsequently switched on by also removing cut-off bias from another of its grids. is denoted in the cycle charts by a sectioned line.

Figure 2:
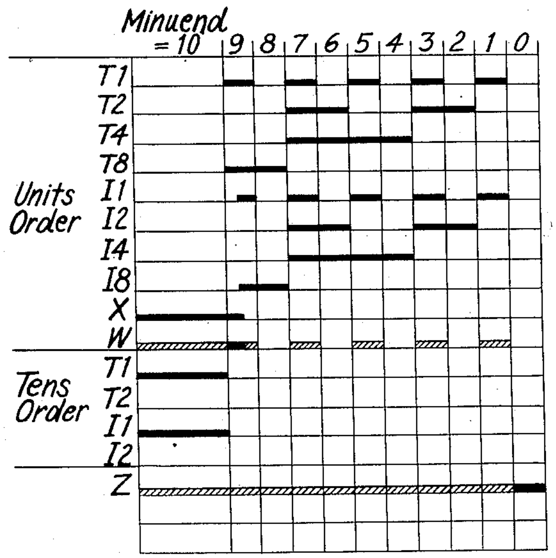
Figure 3A:
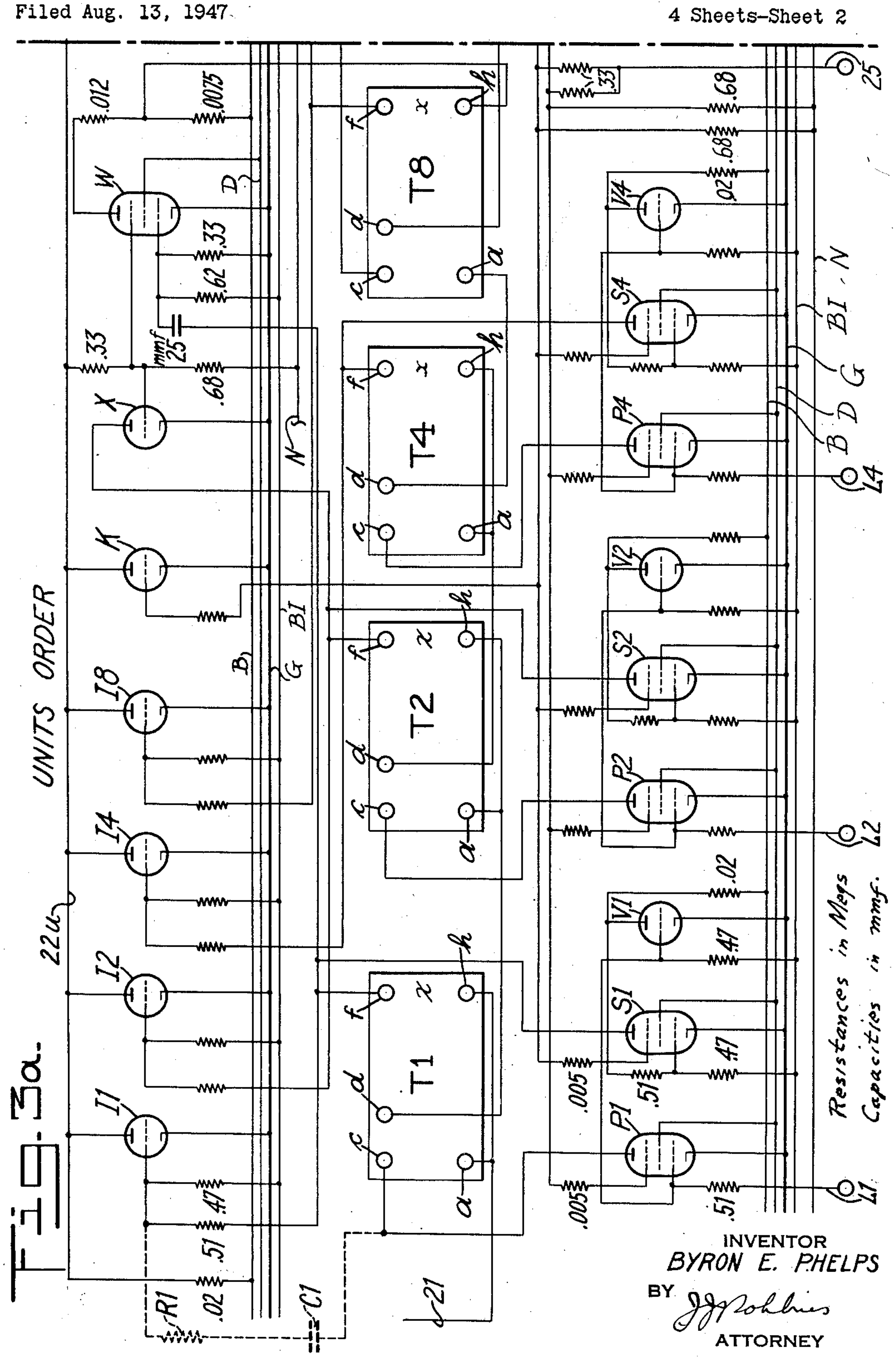
Figure 3B:
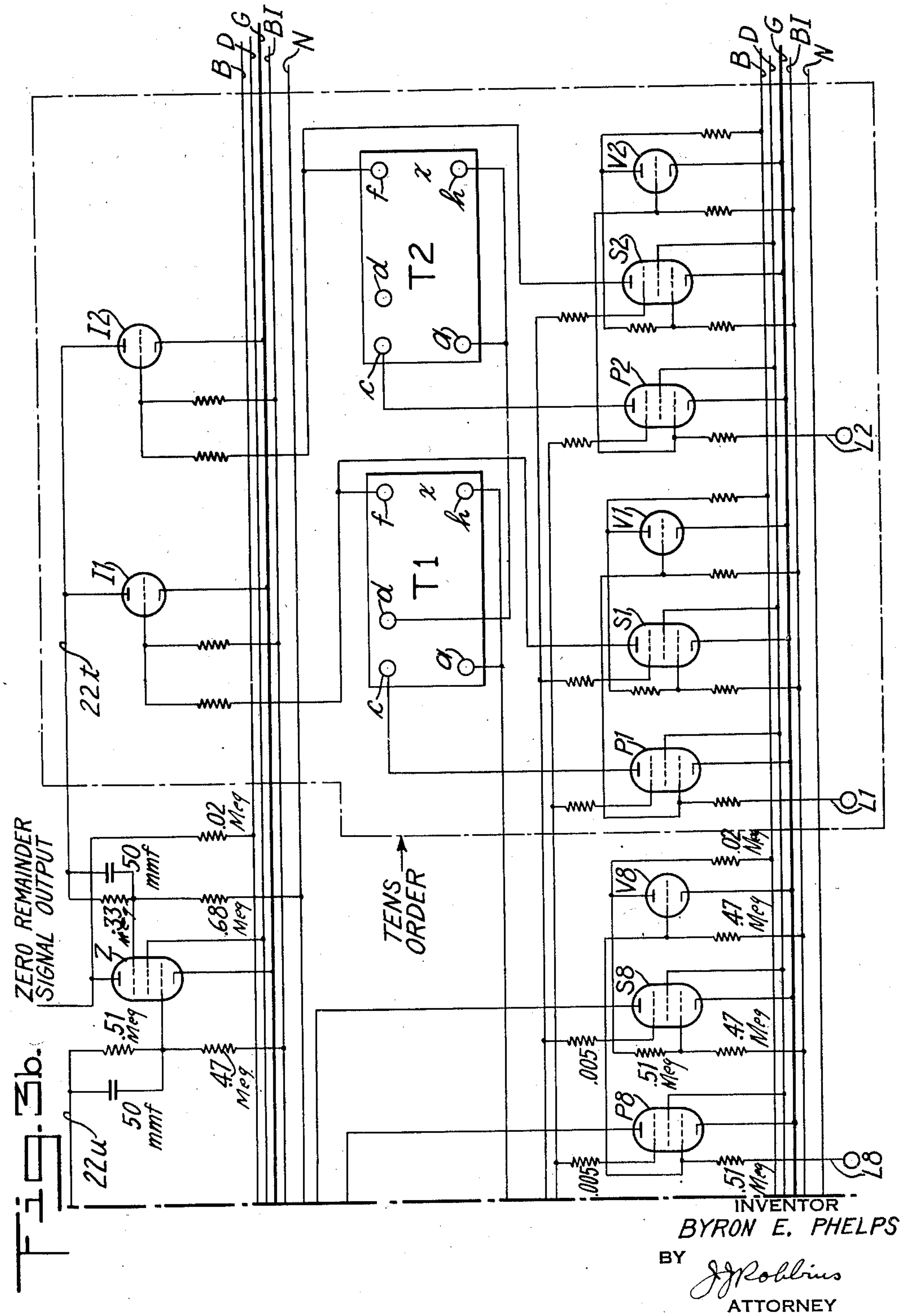

Figs. 3a and 3b show a two-order counter of preferred form and Fig. 2 is the sequence chart for this counter. A complete order includes four stages, each consisting of a trigger T. The four stages are designated T1, T2, T4, and T8 to indicate the values 1, 2, 4 and 8 which they manifest respectively when in on state. It may be noted that these values correspond respectively to the binary terms $2^0$, $2^1$, $2^2$, and $2^3$. If all the stages are off, the order stands at 0; if T1 alone is on, the order is at 1; with T1 and T8 on, the order is at 9, and so on. As illustrative, the tens order includes only stages T1 and T2, limiting the minuend capacity of the counter to no greater than 39.

Tubes I in each order sense zero status of the order. The units order has four such tubes I1, I2, I4 and I8 having a common anode line 22u. The tens order has two tubes I1 and I2 having a common anode line 22t. The grid of each tube I is resistance-coupled to point f of the correspondingly numbered stage in the same order. When the trigger is on, point f is at high potential, so that the associated tube I is on and its anode line is at low potential. When the trigger is off, point f is at low potential and the related tube I is off. All the tubes I in an order are off only when the stages of the order are all off and, hence, when the order is at zero. Under this condition, the common anode line of the tubes I in the order is at high potential. If only a single order counter is used, then the high potential on line 22u will serve as a signal of a zero remainder on the counter. If two or more orders are used, then means are provided to be jointly controlled by the zero sensing means of each order. Thus, in the present case, a pentode Z (Fig. 3b) is provided which has its control and suppressor grids respectively and suitably coupled to lines 22u and 22t. When the tens order is stepped to 0, it conditions Z to go on upon the units order later stepping to zero. As Z goes on, it produces a negative output pulse signaling zero remainder.

The counter is to be stepped in response to negative entry pulses on input line 21 connected to points a and h of T1 in the units order. The stepping must be effected in descending direction upon a decimal count cycle basis. This means that in each complete order, here the units order, the manifestations 0, 9, 8—1, 0 are to be produced successively in response to ten successive impulses, assuming the order starts in zero status. The required operation is obtained in the embodiment under discussion by unique coupling between the stages and by special supplemental circuits including the zero sensing circuit of the units order. The coupling between stages is from point d of T1 to points a and h of T2, from d of T2 to a and h of T4, and from d of T4 to a of T8. Each time a stage T goes on, it produces a sharp negative impulse at its point d. This impulse transmitted to a and h of another trigger is effective to reverse the latter unless its reversal is blocked. Since d of T4 is coupled only to terminal a of T8, the negative impulse at d (T4) can serve merely to trip T8 from on to off state. When a stage goes off, it produces a positive impulse at its point d but this impulse transmitted to a or h or both of another trigger is ineffective upon the latter for the reason previously explained. Confining the explanation for the present to the complete, units order, assume it is at zero, all the stages being off. The first subtractive step must turn on T1 and T8 to manifest 9. But when T1 goes on, it attempts to turn on T2 and this action must be blocked at this step. This is accomplished under control of the zero sensing circuit of tubes I and a blocking tube X. The anode of X is tied to point f of T2 and the grid of X is resistance-coupled to line 22u which is at high potential only in zero status of the order. Accordingly, tube X is on only when the order is at 0. With X on, it prevents the anode point f (T2) from rising above about 50 volts, thus locking T2 in off status. Not only must T2 be prevented from going on upon the first step from 0 of the order, but T8 must go on to combine with T1, also to be turned on, for manifesting 9. T8 is turned on under control of a pentode switching tube W which is conditioned by the zero sensing circuit when the order is at zero and is rendered conductive in response to T1 being turned on upon the first step. To this end, the anode of W is resistance-coupled to point *h* of T8, its control grid is capacity-coupled to point *f* of T1, and its suppressor is resistance-coupled to line 22*u*. With the order at 0, line 22*u* is at high potential, sufficient to overcome the cut-off bias of the suppressor of W. The tube W is then in condition to go on upon the control grid being impulsed above critical potential. When W goes on, it develops a negative impulse upon its anode which is transmitted to point *h* of T8 to turn it on.

A complete stepping cycle of the complete, units order from 0 back to 0 will now be described with reference to Figs. 2, 3*a* and 3*b*. The first entry pulse turns on T1. As T1 turns on, it produces a steep negative pulse at point *d* which attempts to turn on T2. But T2 does not turn on now because it is locked in off state by tube X which remains conductive until the negative pulse at *d*(T1) is spent. Further, as T1 goes on, it produces a steep positive pulse at its point *f* which pulse is capacitatively transferred to the control grid of now-conditioned tube W. Thereupon W becomes momentarily conductive to apply a negative pulse to point *h* of T8, turning it on. When T1 is turned on, it also renders tube I1 conductive to remove high potential from line 22*u*, thus allowing tube X to become non-conductive and causing tube W to be de-conditioned. However, the tubes X and W will accomplish their functions before line 22*u* drops to low potential. This is accounted for by the sharpness of the pulses which appear at points *d* and *f* of T1 as it turns on, and the relation of RC factors of the circuits of I1, X and W. This relation is such that tube W is not de-conditioned and tube X is not turned off until after the negative pulse at *d*(T1) has been spent and the positive pulse at *f*(T1) has turned on W to trip T8 on. Further delay in turning on I1 may be obtained by additionally coupling the grid of I1 through a capacitor C1 and resistor R1 to point *c* of T1, as indicated in dotted lines in Fig. 3*a*. As T1 goes on, its point *c* drops in potential while point *f* rises in potential. The effect on tube I1 of the drop at *c* of T1 is opposite to the effect on I1 of the rise at *f* of T1 so that I1 remains off for an interval governed by the RC time factor of the connections between the grid of I1 and point *c* of T1.

The foregoing has explained the subtractive step of the complete, units order from 0 to 9 in response to the first entry pulse. The second entry pulse trips T1 off and with T8 alone on, the order is at 8. The third pulse trips T1 on, which now is effective to switch T2 on. As T2 goes on, it trips T4 on, and T4, in turn, switches T8 off. The order then stands at 7, T1, T2 and T4 being on. The fourth pulse trips T1 off and as T2 and T4 remain on, the order is at 6. The fifth pulse switches T1 on which causes T2 to go off. Since T1 and T4 now are on, the order is at 5. The sixth pulse turns off T1 and T4 remains on to manifest 4. The seventh pulse trips T1 on which causes T2 to go on and switch T4 off, so the order then stands at 3. The eighth pulse turns off T1 and T2 alone is now on, so that 2 is manifested. The ninth pulse trips T1 on which causes T2 to be switched off, so the order now manifests 1. The tenth pulse turns off T1, and the stages are all off, so the order is back to zero.

When the units order is stepped from 0 to 9, it exceeds its subtractive capacity and carry must be effected to the tens order. The turning on of T8 is unique to this step. Hence, the turning on of T8 may be utilized to control carry to the next order. For this purpose, point *d* of T8 is coupled to points *a* and *h* of T1 in the tens order. When T8 turns on, the resulting negative pulse at its point *d* acts upon points *a* and *h* of T1 in the tens order to reverse T1. Point *d* of T1 in the tens order is coupled to *a* and *h* of T2 in the tens order. Hence, should T1 be in off state, it will be reversed by the carry pulse to one state and, thereupon it will reverse T2. Assume, for instance, that minuend 3 is in the tens order, so that its stages T1 and T2 are on. The first carry pulse turns off T1, leaving 2 standing in the tens order. The second carry pulse turns on T1 which turns off T2, leaving 1 standing in the tens order. The third carry pulse turns off T1 and the tens order is then at 0. It may be noted that the incomplete tens order does not require tubes X and W because an incomplete order, by reason of the unique coupling between stages T1 and T2 and between T2 and T3, if a third stage be included, operates in descending count direction on a pure combinational binary term manifesting basis. The tubes X and W along with a set of tubes I are required only for each complete order of four stages so as to cause it to operate in descending count direction on an over-all decimal count cycle basis.

The tens order will reach zero status before the units order. Thus, if the minuend 19 has been applied to the counter, the first ten entry pulses will step the units order from 9 back to 9 in descending count direction. On the tenth step, when the units order goes from 0 to 9, it applies a carry pulse to the tens order, turning off T1 in the tens order. As the tens order now is at zero, its tubes I1 and I2 are both off and line 22*t* is at high potential, conditioning tube Z. The next nine entry pulses reduce the manifestation in the units order to zero, whereupon its tubes I1, I2, I4 and I8 are all off and line 22*u* is at high potential to turn on conditioned tube Z to produce the zero remainder signal.

The means for entering a minuend will be described next. Minuend entry is most efficiently done here by individually turning on the stages of the counter according to the binary terms 1, 2, 4 and 8 cumulatively manifesting the minuend digits. The manner and means for making a minuend entry render it unnecessary to zeroize the counter prior to minuend entry, as would be necessary in ordinary counters. Here, the minuend entry means substitutes the minuend for any other number which may be previously standing in the counter.

In applying a minued to the counter by individually switching on the stages, the normal interrelated operation of the stages and associated circuits must be overcome. Thus, during minuend application, the turning on of T1 (units order) should not, through W, turn on T8; the turning on of T8 should not produce a carry to the tens order; the turning on of T1 in the tens order should not turn on T2 in the tens order; and the turning on of T2 in the units order must be done after it is released by tube X and must then not turn on T4. The means disclosed herein for applying the minuend solves these problems and includes sets of three minuend input tubes P, S, and V, one set for each stage in the counter. The tubes P, S, and V are further identified by the reference numbers of the related stages and the orders to which they relate. Thus, in the units order, P4, S4, and V4 are the tubes of the set related to stage T4 in the units order.

There are four minuend input lines L1, L2, L4 and L8 for the units order and two input lines L1 and L2 for the incomplete tens order. Suitable means which need not be shown here are provided for selectively applying high potential to the lines L according to the binary terms in the digits of the minuend to be entered. For example, if the minuend digit to be introduced in the units order is 6, lines L2 and L4 in this order are placed at high potential. Each line L similarly controls a corresponding stage through the related set of minuend input tubes P, S, and V. Considering the units order, line L2 controls stage T2 through tubes P2, S2, and V2. The line L2 is resistance-coupled to the control grids of P2 and V2. When L2 is at low potential, these control grids are below critical voltage and block the tubes P2 and V2. When L2 is at high potential, it brings the control grids of P2 and V2 above critical voltage, thus rendering V2 conductive and conditioning P2 to become conductive when its suppressor is raised above its normal cut-off voltage. The anode of V2 is resistance-coupled to the control grid of S2. When V2 is non-conductive, its anode is at high potential and the control grid of S2 is above cut-off bias, conditioning S2 to become conductive when its suppressor is raised above its normal cut-off potential. But when V2 is conductive, its low anode potential de-conditions S2 to prevent it from becoming conductive. It has been explained that when L2 is at high potential, it conditions P2 and renders V2 conductive which, in turn, de-conditions S2. But if L2 is at low potential, P2 is not conditioned and V2 is not conductive, so that S2 is conditioned. Thus, one or the other of tubes P2 and S2 is conditioned but not both at any one time. The anode of P2 connects to point *c* of T2 and the anode of S2 connects to point *f* of T2. When P2 or S2 is not conducting, it has no influence on T2. If P2 is conducting, its anode potential drops to about 50 volts, depressing the point *c* to this potential, so that T2 turns on. If S2 is conductive, then its anode potential is about 50 volts and blocks T2 from turning on. Since only P2 or S2 but not both are conditioned, only one will become conductive upon minuend entry to exert its control over T2.

Similarly, in each set of minuend input tubes, either P or S but not both will be conditioned to become selectively conductive so as selectively to cause the related stage to turn on or prevent its turning on.

To enable minuend digit 2 to be applied to a complete order, means are provided to render tube X non-conductive so as not to lock T2 in off state during minuend entry. For this purpose, a control tube K is included in each complete order. The anode of tube K is tied to the common anode line 22*u* of tubes I in the complete order, here the units order. Upon entry of the minuend, the tube K will be rendered conductive, insuring line 22*u* being at low potential, so that tube X will be rendered non-conductive and ineffective to lock T2 in off state. Also tube W will be de-conditioned to make doubly certain that T8 will not be turned on as a result of T1 being turned on during minuend entry.

The suppressors of all the tubes P and S and the grid of tube K are resistance-coupled to a common line 25 which is normally at low potential, under which condition the suppressors of P and S and the grid of K are all below critical potential. When the minuend entry is to be made, a positive pulse from a suitable source is impressed on line 25, increasing its potential to such extent as to cause the suppressors of P and S and the grid of K to rise above cut-off potential. Tube K thereupon becomes conductive to produce the effect described above. The conditioned ones of the tubes P and S also become conductive to selectively turn on or suppress turning on of the related counter stages.

To take a concrete example, assume minuend 13 is to be entered in the counter. High potential is impressed on lines L1 and L2 of the units order and line L1 of the tens order. Accordingly, in the units order, P1 and P2 are conditioned and V1 and V2 are conductive to de-condition S1 and S2; in the tens order, P1 is conditioned and V1 is conductive to de-condition S1. The remaining P tubes remain un-conditioned and the remaining S tubes remain conditioned. At a later time, a positive pulse is applied to line 25. For the effective duration of this pulse, line 25 is at high potential, causing the conditioned ones of tubes P and S and also the tube K to become conductive. In the units order, P1 is conductive and turns on T1; also P2 is conductive and turns on T2 which has been released for such action as a result of K having been rendered conductive. When T1 turns on, it normally acts through W to turn on T8. But with K now conducting it de-conditions W so that it will not respond to the turning on of T1 and therefore will not attempt to turn on T8. In any event, T8 will not turn on because, in the chosen example, S8 is conductive and locking T8 in off state. In the units order, T2 has been turned on and normally would turn on T4 but since S4 is now conductive, it prevents T4 from turning on. In the tens order, T1 has been turned on and attempts to turn T2 on but as S2 in this order is now conductive, T2 will not turn on. It is to be noted that tube K, while its primary function is to prevent tube X from locking T2 in off state during minuend entry, has the further advantage of allowing a shorter minuend entry timing pulse to be used since it causes immediate drop in potential of line 22*u*, placing the order immediately in condition for proper individual switching of the stages according to the minuend to be applied. In other words, tube K makes possible faster minuend entry and also correct minuend entry.

Figure 4:
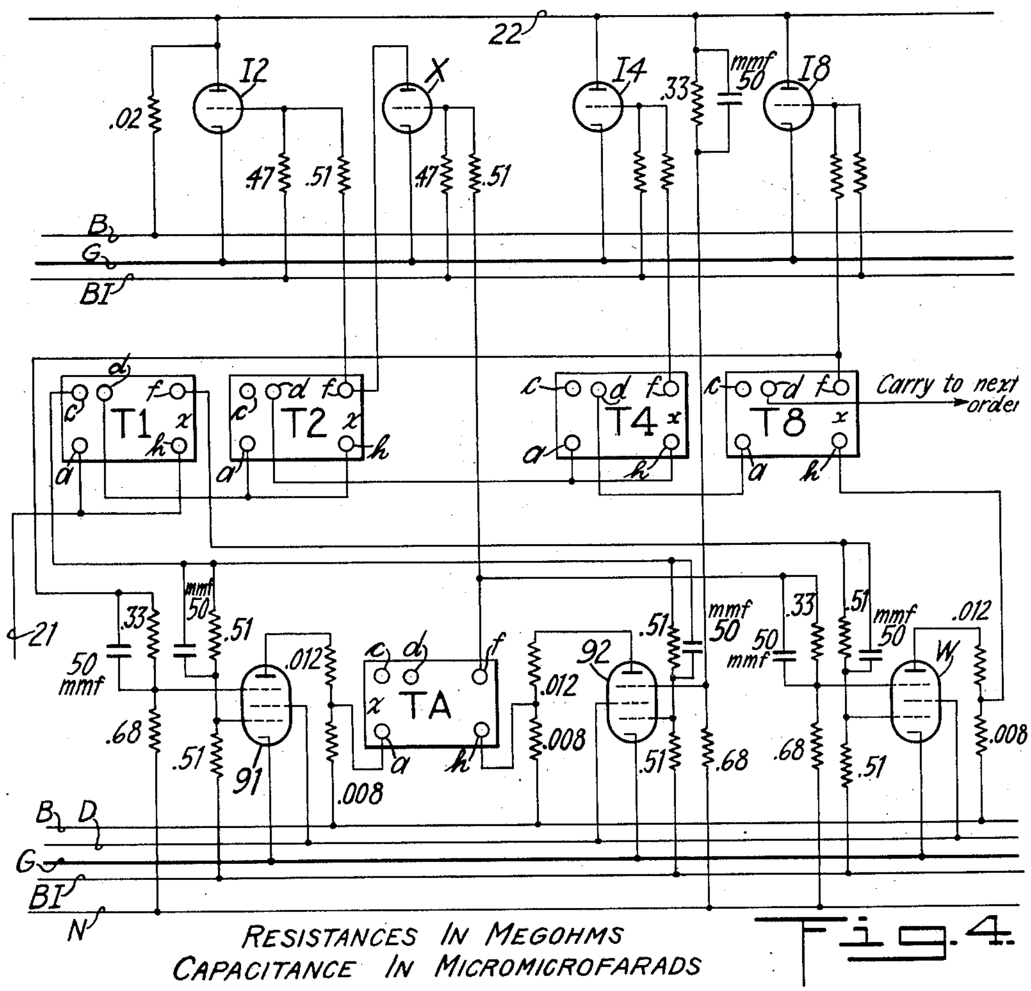
Fig. 4 illustrates the circuit of a modification of a complete order.
Figure 5:
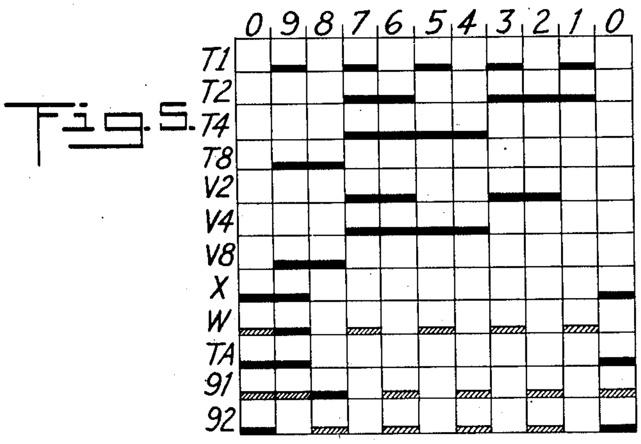
Fig. 5 is a sequence chart pertaining to the Fig. 4 circuit.

Fig. 4 illustrates a modification of a complete order of direct subtraction counter. A sequence chart of its operation is shown in Fig. 5. The elements of this modification which correspond to elements of the previously described embodiment are given like reference designations. Counting stages T1, T2, T4 and T8 are coupled to one another as in the first form. The means for transposing binary type operation of the counter order to a decimal cycle basis include three triodes I2, I4, and I8 which are coupled to stages T2, T4 and T8 as in the first embodiment. The blocking tube X is coupled to T2 also as in the first embodiment but is controlled by tubes I indirectly, through control tubes 91 and 92 and a trigger TA. The pentode W is coupled to stage T8 as in the first embodiment but is conditioned by a trigger TA to be turned on by stage T1 when the latter is tripped on by the first entry pulse received after the order is at zero.

A minuend digit may be applied in a suitable manner as, for instance, in the manner explained for the first embodiment. Let it be assumed the order stands at 2. Under this condition, T2 is on, T1, T4 and T8 are off, I2 is conductive and I4 and I8 are non-conductive. With T1 off, its points c and f are at relatively high and low potentials. Point c of T1 is suitably coupled to the control grids of tubes 91 and 92 and since point c is at high potential, these control grids are now above blocking bias. Point f(T1) is coupled to the control grid of tube W and since this point f now is at low potential, the control grid of W is at blocking bias. The point f of T8 is coupled to the suppressor of 91 and since T8 now is off, its point f and the suppressor of 91 are at low potential. Hence, although 91 is at high control grid potential, it remains non-conductive because its suppressor is at low potential. As the tube I2 is conductive, the common anode line 22 of tubes I is at low potential. Line 22 is coupled to the suppressor of 92 and being at low potential, it maintains the suppressor at low potential, so that 92 remains off despite its high control grid potential. Point f of trigger TA is coupled to the grid of tube X and the suppressor of tube W. With the order now at 2, TA is off and its point f at low potential, so that X is now off and the suppressor of W is at blocking potential.

The next entry pulse on input circuit 21 trips T1 on, which causes T2 to go off. The order now stands at 1. With T1 on, its point c is at low potential and its point f at high potential. Therefore, the control grids of 91 and 92, connected to point c(T1) are now at blocking potential, while the control grid of W, connected to point f(T1) is above blocking potential. Since T8 still is off, its point f and the suppressor of 91 remain at low potential. When T2 turned off, it rendered I2 non-conductive; all the tubes I now are non-conductive, allowing line 22 to rise to high potential. The suppressor of 92 therefore is driven above blocking potential, but 92 does not become conductive because its control grid now is at low potential. Trigger TA remains in off state.

The following entry pulse turns off T1. All the stages now are off and the order stands at 0. As T1 trips off, its point c rises in potential, returning the control grids of 91 and 92 to a potential above cut-off value. Tube 91 still does not conduct because its suppressor is still at blocking potential. In the preceding step, the suppressor of 92 was raised above blocking potential. Now, when the order steps from 1 to 0, the control grid of 92 also is raised in potential. Accordingly, 92 becomes conductive and applies a negative, tripping pulse to point h of TA, turning it on. As TA goes on, its point f rises in potential, thus rendering tube X conductive and conditioning tube W. Tube X now is effective to lock T2 in off state.

The next entry pulse turns on T1. As T1 goes on, it tends to turn on T2 but the latter now is locked in off state by conductive tube X. Further, as T1 goes on, its point f rises in potential and drives the control grid of W above blocking potential. Tube W, having been conditioned by on status of TA in the preceding step, therefore becomes conductive, producing a negative, tripping pulse which turns on T8. The order now stands at 9, T1 and T8 being on. With T8 on, I8 is conductive and line 22 drops in potential, as does the suppressor of tube 92. Further, with T8 on, its point f is at high potential, as is the connected suppressor of tube 91. Hence tube 91, but not tube 92, is conditioned to respond to the next turning off of T1. Still further, as T8 turned on, it produced a negative carry pulse at its point d for causing a carry to the next order, as in the first embodiment.

The next entry pulse turns off T1; T8 remains on, so the order manifests 8. As T1 turns off, its point c rises in potential, as does the control grid of conditioned tube 91. Accordingly, 91 becomes conductive, developing a negative tripping pulse which is applied to point a of TA to turn off TA. With TA off, its point f is at low potential, so that tube X is now non-conductive and tube W is now de-conditioned. As tube X is non-conductive, it releases T2 for on-switching at the next step.

The other steps in the sequence may be followed through readily with the aid of Fig. 5.

It is clear that the modified complete order shown in Fig. 4 differs from the embodiment shown in Fig. 3 in the means for transposing count descending operation of the order from a binary basis to a decimal cycle basis.

While there have been shown and described and pointed out the fundamental novel features of the invention as applied to a preferred embodiment and a modification, it will be understood that various omissions and substitutions and changes in the several forms and details of the devices illustrated and in their operation may be made by those skilled in the art, without departing from the spirit of the invention. It is the intention, therefore, to be limited only as indicated by the scope of the following claims.

What is claimed is:

1. A direct subtraction electronic counter including a denominational order network of triggers fewer than the number of digits in the tens notation and serving singly and in combination, by their selective states, to manifest selectively the different digits of the tens notation, means to apply a minuend digit to the network of triggers, a circuit for applying to the network successive pulses representing the true value of a subtrahend, and circuits coupling the triggers for response to said pulses in descending count sequence so as to diminish the minuend digit by the subtrahend, said coupling circuits including means conditioned by the triggers when manifesting zero for operating, upon application to the series of triggers of the next pulse, to reset the triggers to a manifestation of nine.

2. A descending electric counter including a binary decimal group of "1," "2," "4," and "8" electric triggers, each having alternative stable on and off electrical states, to manifest singly and in combination by their on states the values 0 to 9, said group having fewer triggers than the number of digits in the decimal notation, a circuit for applying input pulses to the "1" trigger, each pulse reversing this trigger, circuits coupling the triggers in generally binary counter fashion for descending counter sequence of reversals in state in response to the reversals of the "1" trigger, said coupling circuits including supplemental means for transposing operation of the group of triggers from a binary count basis and electronic means for entering a minuend in accordance with its binary notation to a direct subtraction decimal basis.

3. A descending electric counter such as defined in claim 2, said supplemental means including an electric space discharge device, conditioned by the group of triggers when in off state and manifesting zero, said discharge device being coupled to the "1" trigger to be operated thereby, after being conditioned, when turned on by an input pulse for producing a pulse to turn on the "8" trigger, so that the group of triggers manifests 9 after manifesting 0.

4. An electronic register including a group of electronic triggers, each having alternative stable states, for selectively manifesting according to their states the digits of a chosen notation, circuits coupling the triggers for interrelated reversals in state in response to pulses applied to the group so as to receive entry of a digit dependent on the number of applied pulses and to change the digit manifestation accordingly, and means for applying a digit directly to the group of triggers, said means including circuits for rendering the coupling circuits ineffective and for applying potentials to the triggers selectively to reverse them individually and independently to set them in states for manifesting the applied digit.

5. An electronic register including a group of electronic triggers, each having alternative stable states, for selectively manifesting according to their states the digits of a chosen notation, circuits coupling the triggers for interrelated reversals in state in response to pulses applied to the group so as to receive entry of a digit dependent on the number of applied pulses and to change the digit manifestation accordingly, and means for applying a digit directly to the group of triggers, said means including for each trigger a tripping circuit operable to apply potential to the trigger to reverse its state and an opposing circuit coupled to the trigger and operable for blocking the reversal of the trigger, and means for selectively rendering the tripping circuits and the opposing circuits operable in accordance with the digit to be applied to the group of triggers, said opposing circuits preventing the triggers from being reversed by potential derived through the coupling circuits.

6. A direct subtraction binary-decade counter including a denominational order network having four inherently binary triggers connected in series chain, each trigger comprising first and second grid controlled tubes and having on and off states; means for entering a minuend in said counter in binary form; a connection from the grids of the tubes of the first trigger to a source of pulses used as subtrahend entries; four trigger status sensing tubes, one for each of said triggers, and each having its control grid connected to the plate of the second tube of the corresponding trigger so that it is conductive when its corresponding trigger is on and non-conductive when its corresponding trigger is off, a remainder line connecting the plates of said four tubes, so that said line is at its highest voltage when all said triggers are off; a blocking tube having its plate connected to the plate of the second tube of the second trigger and its control grid connected to said line, to be plate current responsive to the highest voltage thereon so as to lock the second trigger off; a multi-grid switching tube having one grid connected to said remainder line and one grid capacitively coupled to the plate of the second tube of the first trigger so that the highest voltage on said line conditions said multi-grid tube and the tripping of the first trigger to the on state renders the multi-grid tube conductive, and a connection from the plate circuit of said multi-grid tube to the control grid of the second tube of the fourth trigger to trip it on when the switching tube is rendered conductive, whereby said tripping on of the first trigger steps the counter from its lowest to highest digital capacity.

7. The counter of claim 6 wherein said means for entering a minuend includes first, second and third electron tubes and a minuend input terminal for each of said four triggers; connections from the plates of said first and second electron tubes to the plates of the first and second tubes, respectively, of the corresponding trigger so that conduction through the first electron tube trips the trigger on and conduction through the second electron tube locks the trigger off; a connection from said input terminal to a grid of said first tube and the control grid of said third tube, a connection from the plate of the third tube to a grid of the second tube, so that the second tube only, is conditioned, when the third tube is non-conductive and the first tube only, is conditioned, when a positive voltage is applied to the corresponding input terminal to render the third tube conductive; a control tube having its plate connected to said remainder line to decrease the voltage thereon when said control tube is conductive to render said blocking tube non-conductive; a source of positive pulses connected to a grid of said control tube and to a second grid of said first and second electron tubes and applied subsequent to each application of pulses to the minuend input terminals to render the control tube and said first electron tube conductive, the conduction of said control tube rendering said blocking tube non-conductive and to de-condition said switching tube thereby insuring that the fourth trigger will not be tripped on when the first trigger is tripped on.

8. The counter of claim 6 including a plurality of similar denominational order networks connected in series chain, the subtrahend entries for each higher network being supplied only by the next lower network when it is tripped from its lowest to highest digital capacity; a multi-grid tube for signaling a zero remainder and having one grid connected to the remainder line of one order and another grid connected to the remainder line of another order so that it is rendered conductive only when there is zero remainder in each of the two orders.

9. A direct subtraction binary-decade counter, including a denominational order network having four inherently binary triggers connected in series chain, each trigger comprising two grid controlled tubes and having on and off states; bias means for placing all triggers in the off state at starting; means for entering a minuend in said counter in binary fashion; a connection from the first trigger to a source of pulses used as subtrahend entries; second, third and fourth trigger status sensing tubes each having their control grid connected to the plate of the second tube of the corresponding trigger so that it is conductive only when its corresponding trigger is on; a remainder line connecting the plates of said sensing tubes in parallel so that said line is at its highest voltage when all said corresponding triggers are off; a fifth trigger circuit in the on state at starting; first and second multi-grid control tubes, said first tube having one grid coupled to the plate of the first tube of the first trigger, another grid coupled to the plate of the second tube of the fourth trigger and its plate coupled to the grid of the first tube of said fifth trigger so that said first tube is conductive only when the first trigger is off and the fourth trigger is on simultaneously to trip said fifth trigger off and said second tube having one grid coupled to the plate of the first tube of the first trigger, another grid coupled to said line and its plate coupled to the grid of the second tube of said fifth trigger so that said second tube is conductive only when the first trigger is off and the status sensing tubes non-conductive simultaneously to trip said fifth trigger on; a multigrid switching tube having one grid coupled to the plate of the second tube of said fifth trigger, another grid coupled to the plate of the second tube of the first trigger and its plate coupled to the grid of the second tube of the fourth trigger so that said switching tube is conductive only when the first trigger is on and said fifth trigger is on simultaneously to trip the fourth trigger on; a grid controlled blocking tube having its plate connected to the plate of the second tube of the second trigger and its control grid coupled to the plate of the second tube of said fifth trigger so that said blocking tube is conductive when said fifth trigger is on to lock the second trigger off.

10. In a direct subtraction binary-decade counter including a plurality of denominational order networks each having four inherently binary triggers connected in series chain and each trigger having on and off states; means for entering a minuend in said counter according to binary notation; means for applying subtrahend entries to reverse the state of the first trigger; a sensing tube operated by each trigger to be conductive only when the trigger is on; a remainder line having a potential thereon under combined control of said sensing tubes; a blocking tube controlled by the potential on said line to lock the second trigger off when said sensing tubes are all non-conductive; a switching tube responsive to said line and the first trigger; means coupling said switching tube to the fourth trigger to effect a tripping thereof to change the digital capacity of the counter from its lowest to highest value.

11. In a binary-decade counter including a denominational order network of four inherently binary triggers connected in series chain and having two stable states alternately assumed; bias means for placing said trigger in a preselected stable state; means for applying subtrahend entries to trip the first trigger from either stable state; electronic tube means responsive only when said network manifests a zero remainder and the first trigger is tripped from the preselected state to trip the fourth trigger from the preselected state to render said network responsive in descending count sequence to subsequent subtrahend entries; first, second and third minuend input tubes for each trigger; means for applying minuend entries to said input tubes according to the binary notation to trip the corresponding trigger; and a source of pulses applied subsequent to each minuend entry to disable said electronic tube means.

12. The direct subtraction binary-decade counter, including denominational order network having four inherently binary triggers connected in series chain, each trigger comprising two grid control tubes and having two stable states; bias means for placing all triggers in a preselected stable state at starting; means for entering a minuend in said counter according to the binary notation; means for applying subtrahend entries to the first trigger; a plurality of trigger status sensing tubes and a line common thereto, said line having voltage thereon determined by the conductive condition of tubes; a fifth trigger; a first control tube responsive to the first trigger and the fourth trigger conjointly to trip said fifth trigger from only one stable state; a second control tube responsive to the first trigger and to said line conjointly to trip said fifth trigger to only said one said stable state; a switching tube responsive to said fifth trigger and the first trigger conjointly to trip the fourth trigger to only one stable state; and a blocking tube responsive to the second trigger and said fifth trigger conjointly to lock said fifth trigger in only one stable state when the second trigger is in the other stable state.

13. A descending electronic counter including a plurality of carry-related denominational order networks of electric space discharge devices variably energized by applied potential to manifest selectively different digits of a notation; each network having an input circuit for applying pulses representing the direct value of a subtrahend to the network, and circuits coupling the discharge devices for interrelated descending count sequence of changes in energization in response to the applied pulse to subtract said direct value from the digit previously manifested by said devices, said coupling circuits including means to compel the devices when energized for manifesting zero to change to a manifestation of the highest digit of the notation in response to the next applied pulse· a circuit for signaling a zero remainder in the counter; and a plurality of circuits, each conditioned by a related order network when in zero status, for collectively operating to render said signaling circuit effective when all said order networks are brought to zero status.

14. An electronic binary-decade counter settable with a minuend amount and capable of direct subtraction and including a denominational order series of electronic triggers fewer than the number of digits in the tens notation and serving singly and in combination, by their selective states, to manifest selectively the different digits of the tens notation, a circuit for applying to the first trigger in the series input pulses representing the true value of a subtrahend, each pulse reversing this trigger, circuits coupling the triggers of the series in binary counter series chain for response to the input pulses and the reversals of said first trigger in descending count manifesting sequence until the series of triggers manifests zero, and means for transposing operation of the series of triggers from a binary counting basis to a direct subtraction decimal basis comprising electronic tube means conditioned by the series of triggers when manifesting zero for operating, upon the application to said first trigger of the next input pulse and the reversal of the first trigger by this next pulse, to reset the series of triggers to a manifestation of nine.

BYRON E. PHELPS.

REFERENCES CITED

The following references are of record in the file of this patent:

UNITED STATES PATENTS

| Number | Name | Date |
|---|---|---|
| 2,402,988 | Dickinson | July 2, 1946 |
| 2,402,989 | Dickinson | July 2, 1946 |
| 2,428,990 | Rajchman | Oct. 14, 1947 |
| 2,442,428 | Mumma | June 1, 1948 |